United States Patent
Steinmacher-Burow

(10) Patent No.: US 9,916,247 B2
(45) Date of Patent: Mar. 13, 2018

(54) CACHE MANAGEMENT DIRECTORY WHERE HARDWARE MANAGES CACHE WRITE REQUESTS AND SOFTWARE MANAGES CACHE READ REQUESTS

(71) Applicant: INTERNATIONAL BUSINESS MACHINES CORPORATION, Armonk, NY (US)

(72) Inventor: Burkhard Steinmacher-Burow, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 15/015,316

(22) Filed: Feb. 4, 2016

(65) Prior Publication Data

US 2017/0228316 A1  Aug. 10, 2017

(51) Int. Cl.
  *G06F 12/08* (2016.01)
  *G06F 12/0817* (2016.01)
  *G06F 12/084* (2016.01)

(52) U.S. Cl.
  CPC ........ *G06F 12/0817* (2013.01); *G06F 12/084* (2013.01); *G06F 2212/621* (2013.01)

(58) Field of Classification Search
  CPC .............. G06F 12/0817; G06F 12/084; G06F 2212/621
  See application file for complete search history.

(56) References Cited

U.S. PATENT DOCUMENTS

| | | | |
|---|---|---|---|
| 7,657,710 | B2 | 2/2010 | Loewenstein |
| 7,895,400 | B2 | 2/2011 | O'Krafka et al. |
| 8,490,065 | B2 | 7/2013 | Archambault et al. |
| 8,892,824 | B2 | 11/2014 | Chen et al. |
| 9,086,974 | B2 | 7/2015 | Busaba et al. |
| 2008/0120441 | A1 | 5/2008 | Loewenstein |
| 2013/0254488 | A1 | 9/2013 | Kaxiras et al. |

(Continued)

OTHER PUBLICATIONS

Advanced Micro Devices, Inc., "Southern Islands Series Instruction Set Architecture", AMD Accelerated Parallel processing Technology, Reference Guide, Dec. 2012, 298 pages.

(Continued)

*Primary Examiner* — Reginald Bragdon
*Assistant Examiner* — Edward Wang
(74) *Attorney, Agent, or Firm* — Teddi E. Maranzano

(57) ABSTRACT

A method is provided for cache coherence being based on a hybrid approach relying on hardware-and software-implemented functionalities. In case a processor core is requested to perform a write operation on a memory line missed in the local cache of said core, a hardware-implemented coherence directory ensures that said processor core becomes assigned exclusive write permissions to indicate that the memory line in said local cache is up-to-date after said write. In case the processor core is requested to perform a read operation on a memory line missed in the local cache of said processor core, the coherence directory updates the coherence directory to indicate that none of the processor cores of the system has exclusive write permission on the memory line and relies on software executed on said processor core to ensure that the cached memory line is up-to-date before performing the read operation.

18 Claims, 6 Drawing Sheets

(56) References Cited

U.S. PATENT DOCUMENTS

2014/0032829 A1* 1/2014 Solihin ............... G11C 7/1072
                                                                                 711/105
2015/0067246 A1 3/2015 Kanchana et al.

OTHER PUBLICATIONS

IBM, "Book E: Enhanced PowerPCTM Architecture", Version 1.0, May 7, 2002, 452 pages.
Wikipedia, "Cache coherence", From Wikipedia, the free encyclopedia, https://en.wikipedia.org/wiki/Cache_coherence, Printed on Feb. 10, 2015, pp. 1-4.
Cain et al., "Constraint Graph Analysis of Multithreaded Programs", Journal of Instruction-Level Parallelism 6 (2004) 1-23, Submitted Oct. 2003; published Apr. 2004, 23 pages.
Choi et al., "DeNovo: Rethinking the Memory Hierarchy for Disciplined Parallelism*", Appears in Proceedings of the 20th International Conference on Parallel Architectures and Compilation Techniques (PACT), Oct. 2011, pp. 1-12.
Wikipedia, "Consistency model", From Wikipedia, the free encyclopedia, https://en.wikipedia.org/wiki/Consistency_model, Printed on Feb. 10, 2015, pp. 1-12.
Cuesta et al., "Increasing the Effectiveness of Directory Caches by Deactivating Coherence for Private Memort Blocks", ISCA '11, Jun. 4-8, 2011, San Jose, California, USA, pp. 93-103.
Wikipedia, "Delta consistency", From Wikipedia, the free encyclopedia, https://en.wikipedia.org/wiki/Delta_consistency, Printed on Feb. 10, 2015, 1 page.
Wikipedia, "Distributed shared memory", From Wikipedia, the free encyclopedia, https://en.wikipedia.org/wiki/Distributed_shared_memory, Printed on Feb. 10, 2015, pp. 1-6.
Cain et al., "Edge Chasing Delayed Consistency: Pushing the Limits of Weak Memory Models", Proceedings of the 2012 ACM workshop on Relaxing synchronization for multicore and manycore scalability, 12 pages.
Fensch, "An OS-Based Alternative to Full Hardware Coherence on Tiled Chip-Multiprocessors", University of Edinburgh, 2008, 172 pages.
Soundararajan, "Flexible Use of Memory for Replication/Migration in Cache-Coherent DSM Multiprocessors", Technical Report: CSL-TR-99-789, Nov. 1999, This work was supported in part by ARPA contract DABT63-94-C-0054, 143 pages.
Gschwind, "Optimizing Data Sharing and Address Translation for the Cell BE Heterogeneous Chip Multiprocessor", IEEE International Conference on Computer Design, ICCD 2008, 8 pages.
Keramidas et al., "D2.3—Specifications of Cache Coherency Modules", Aug. 15, 2010, Information and Communication Technologies (ICT) Programme, Project No. FP7-ICT-247615, HEAP, 36 pages.
Hower et al., "Calvin: Deterministic or Not? Free Will to Choose", Proceedings of the 2011 IEEE 17th International Symposium on High Performance Computer Architecture, pp. 1-12.
Kelm et al., "A Task-centric Memory Model for Scalable Accelerator Architectures", 2009 18th International Conference on Parallel Architectures and Compilation Techniques, pp. 77-87.
Lawrence, "A Survey of Cache Coherence Mechanisms in Shared Memory Multiprocessors", May 14, 1998, Department of Computer Science, University of Manitoba, pp. 1-27.
Lebeck et al., "Dynamic Self-Invalidation: Reducing Coherence Overhead in Shared-Memory Multiprocessors", Appears in: "Proceedings of the 22nd Annual International Symposium on Computer Architecture", Reprinted by permission of ACM, 1995, 12 pages.
Wikipedia, "Memory coherence", From Wikipedia, the free encyclopedia, https://en.wikipedia.org/wiki/Memory_coherence, Printed on Feb. 10, 2015, pp. 1-2.
Wikipedia, "Memory management unit", From Wikipedia, the free encyclopedia, https://en.wikipedia.org/wiki/Memory_management_unit, Printed on Feb. 10, 2015, pp. 1-9.
Wikipedia, "Memory ordering", From Wikipedia, the free encyclopedia, https://en.wikipedia.org/wiki/Memory_ordering, Printed on Feb. 10, 2015, pp. 1-5.
Wikipedia, "MSI protocol", From Wikipedia, the free encyclopedia, https://en.wikipedia.org/wiki/MSI_protocol, Printed on Feb. 10, 2015, pp. 1-2.
Dalessandro et al., "NOrec: Streamlining STM by Abolishing Ownership Records", PPoPP Jan. 9-14, 2010, Bangalore, India, Copyright © 2010 ACM, pp. 67-77.
Kaxiras et al., "Power-Scalable Coherence", Department of Electrical and Computer Engineering, University of Patras, Greece, Aug. 6, 2015, 18 pages.
Freescale Semiconductor, Inc., "Multiprocessor Systems and the PowerPC 603e ™Microprocessor", Power PC, AN1294/D, (Freescale Order Number), 2004, 5 pages.
Wikipedia, "Release consistency", From Wikipedia, the free encyclopedia, https://en.wikipedia.org/wiki/Release_consistency, Printed on Feb. 10, 2015, 1 page.
Ros et al., "Complexity-Effective Multicore Coherence", PACT'12, Sep. 19-23, 2012, Minneapolis, Minnesota, USA, pp. 241-251.
Kaxiras et al., "SARC Coherence: Scaling Directory Cache Coherence in Performance and Power", Published by the IEEE Computer Society, 2010, pp. 54-65.
Sartor et al., "Cooperative Cache Scrubbing", PACT'14, Aug. 24-27, 2014, Edmonton, AB, Canada, Copyright 2014 ACM, 12 pages.
Wikipedia, "Sequential consistency", From Wikipedia, the free encyclopedia, https://en.wikipedia.org/wiki/Sequential_consistency, Printed on Feb. 10, 2015, 1 page.
Singh et al., "Cache Coherence for GPU Architectures", Published in Micro, IEEE, vol. 34, Issue: 3, Mar. 5, 2014, 13 pages.
Suh et al., "Supporting Cache Coherence in Heterogeneous Multiprocessor Systems", Published in Design, Automation and Test in Europe Conference and Exhibition, 2004, vol. 2, 6 pages.
Devadas, "Toward a Coherent Multicore Memory Model", Published by the IEEE Computer Society, Oct. 2013, pp. 30-31.
Ros et al., "VIPS: Simple Directory-Less Broadcast-Less Cache Coherence Protocol", Nov. 29, 2011, Department of Information Technology, Uppsala University, Sweden, 26 pages.

* cited by examiner

Cache Coherence (single processor)

Cache Coherence (cross processor)

CACHE MANAGEMENT DIRECTORY WHERE HARDWARE MANAGES CACHE WRITE REQUESTS AND SOFTWARE MANAGES CACHE READ REQUESTS

BACKGROUND

The present invention relates to processor cache management, and more specifically, to the cache coherence in a multi-processor or multi-processor core system.

In multi-processor (or multi-core) systems, multiple processing elements operate at the same time. Therefore, it is possible that they simultaneously access the same memory line. Provided none of the processing elements changes the data in this memory line, they can share it indefinitely and cache it as they please. But as soon as one processing element updates the location, the other processing elements might work on an out-of-date copy that, for example, resides in their respective local cache. Consequently, to maintain coherence a process notifies all the processing elements of changes to a shared memory lines. Said process is referred to as "cache coherence protocol", "cc-protocol" or "memory coherence protocol".

In some systems, the performance of the cache coherence protocol constitutes a performance bottleneck. In some systems it would be desirable to reduce the size and cost of the hardware implementing the cache coherence protocol.

SUMMARY

In one aspect, as computer system is provided and includes a first processor core and a first local cache. The first local cache is operatively coupled to the first processor core for caching memory lines to be accessed by the first processor core. The first local cache includes first permission information indicating to which ones of the memory lines cached in the first local cache the first processor core has exclusive write permission. The computer system includes a second processor core and a second local cache. The second local cache is operatively coupled to the second processor core for caching memory lines to be accessed by the second processor core. The second local cache includes second permission information indicating to which ones of the memory lines cached in the second local cache the second processor core has exclusive write permission. The computer system includes a main memory operatively coupled to the first and the second local cache to provide memory lines to the first and the second local caches. The computer system includes a coherence directory being a firmware and/or hardware unit configured for ensuring that the first and second processor cores, each via its respective local cache, access the same sequence of data values written by the first or second processor core to a particular memory line of the main memory.

The coherence directory is configured for determining, in response to receiving a request from the first processor core to perform a read or write operation on a particular memory line missed in the first local cache, if the second local cache includes a copy of the particular memory line and has exclusive permission to write to the copy contained in the second local cache. Based on the determination returning TRUE, the coherence directory requests the second local cache to remove the exclusive write permission of the second processor core for the copy of the particular memory line from the second permission information. The coherence directory requests the second local cache to write the up-to-date data contained in said copy to the main memory. The coherence directory retrieves the up-to-date data from the main memory and stores the retrieved up-to-date data to the first local cache.

Furthermore, based on the requested operation being a write operation, the coherence directory updates a coherence table of the coherence directory and the first permission information to respectively indicate that the first processor core has exclusive write permission on the provided up-to-date data in the first local cache. Based on the requested operation being a read operation, the coherence directory updates the coherence table to indicate that none of the processor cores of the computer system has exclusive write permission on the particular memory line.

In a further aspect, a computer-implemented method of ensuring cache consistency in a computer system is provided. The computer system includes a first processor core and a first local cache, the first local cache being operatively coupled to the first processor core for caching memory lines to be accessed by the first processor core, the first local cache including first permission information indicating to which ones of the memory lines cached in the first local cache the first processor core has exclusive write permission The computer system includes a second processor core and a second local cache, the second local cache being operatively coupled to the second processor core for caching memory lines to be accessed by the second processor core, the second local cache including second permission information indicating to which ones of the memory lines cached in the second local cache the second processor core has exclusive write permission. The computer system includes a main memory operatively coupled to the first and the second local cache to provide memory lines to the first and the second local caches, and a coherence directory being a firmware and/or hardware unit configured for ensuring that the first and second processor cores, each via its respective local cache, access the same sequence of data values written by the first or second processor core to a particular memory line of the main memory.

The method includes, in response to receiving a request from the first processor core to perform a read or write operation on a particular memory line missed in the first local cache, determining, by the coherence directory, if the second local cache includes a copy of the particular memory line and has exclusive permission to write to said copy contained in said second local cache. The method includes, based on the determination returning TRUE, performing, by the coherence directory requesting the second local cache to remove the exclusive write permission of the second processor core for the copy of the particular memory line from the second permission information, and requesting the second local cache to write the up-to-date data contained in said copy to the main memory. The method includes retrieving the up-to-date data from the main memory and storing the retrieved up-to-date data to the first local cache.

In addition, the method includes based on the requested operation being a write operation, updating, by the coherence directory, a coherence table of the coherence directory and the first permission information to respectively indicate that the first processor core has exclusive write permission on the provided up-to-date data in the first local cache. Based on the requested operation being a read operation, the method includes updating, by the coherence directory, the coherence table to indicate that none of the processor cores of the computer system has exclusive write permission on the particular memory line.

In a further aspect, a computer readable storage medium having program instructions embodied therewith is provided. The program instructions implement an application program including a first and a second program thread concurrently executable on a first processor core and a second processor core of a computer system. The computer system includes the first and second processor cores. A first local cache is operatively coupled to the first processor core for caching memory lines to be accessed by the first processor core. A second local cache is operatively coupled to the second processor core for caching memory lines to be accessed by the second processor core. The computer program product includes a main memory operatively coupled to the first and the second local cache to provide memory lines to the first and the second local caches and a coherence directory. The coherence directory is a firmware and/or hardware unit configured for ensuring that the first and second processor cores, each via its respective local cache, access the same sequence of data values written by the first or second processor core to a particular memory line.

The computer program product is configured for accessing the coherence directory to ensure that the first processor core has exclusive write permissions on the memory line, based on the first thread executed on the first processor core being a write operation on a particular memory line cached in the first local cache. The computer program product performs, by the first thread executed on the first processor core, a read operation on a particular memory line cached in the first local cache. Prior to the read operation, the first thread checks if a notification of the second thread was received by the first thread, the notification indicating that the particular memory line cached in the first local cache is potentially an outdated copy of said memory line. If the notification was received, the first thread invalidates the particular memory line cached in the first local cache. The first thread invalidates the particular memory line cached in the first local cache for ensuring that the read operation is performed on an up-to-date copy of the particular memory line in the first local cache.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1A:
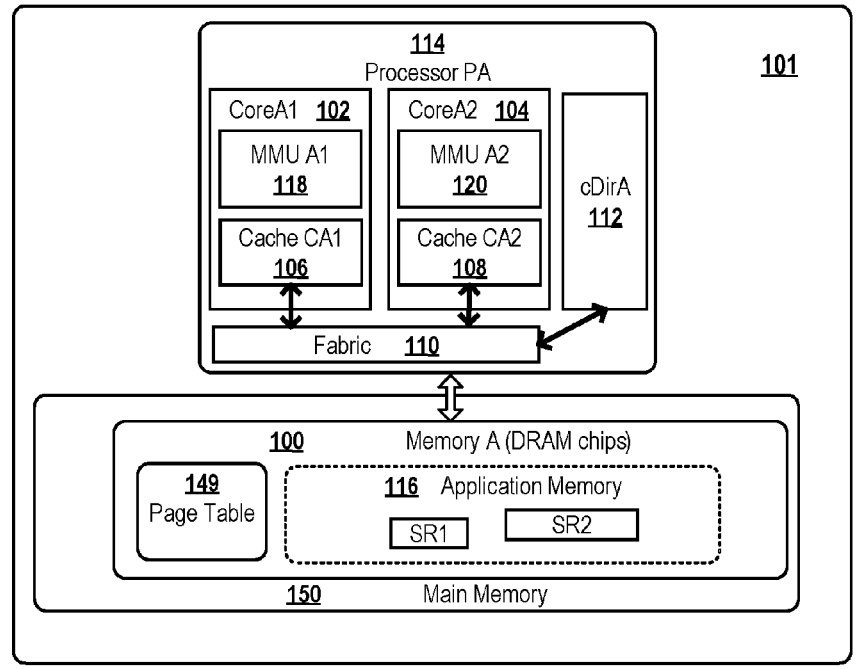
FIG. 1a depicts a system including a processor with multiple cores and local caches according to embodiments of the disclosure.

Embodiments of the invention may have the advantage that a method for cache coherence is provided that is fast and consumes less computational hardware resources than state of the art approaches.

Embodiments of the invention may have the advantage that some tasks having previously performed by a cache coherence directory ("cDir") in response to a read request are now delegated to the software logic issuing the read request. The cDir may not be responsible any more for ensuring that a read request loads up-to-date data. Rather, the software itself has to ensure that the loading of stale data is avoided and that any outdated copy of the requested memory line is invalidated from the local cache of the executing processor core in time. Embodiments of the invention allow reducing the size of the cDir, in particular the size of each row in the coherence table of the cDir, thereby allowing increasing the number of memory lines that can be managed by the cDir (and its cDir table) and/or reducing the consumption of cDir table space.

A "computer system" may include one or more processors, main memory and a system bus for connecting the one or more processors with I/O devices and the main memory.

A "processor" or "CPU" as used herein is a combination of one or more "processor cores" (also referred to as 'cores') with supporting hardware to share resources between said 'cores'.

A "processor core" as used herein is a data processing element that handles mathematical and logical workloads of a computer. Typically, a processor core decodes high level machine instructions (x86, ARM, MIPS, etc. . . . ) into physical circuit operations. A processor core typically includes an arithmetic logic unit (ALU) that performs arithmetic and logic operations, processor registers that supply operands to the ALU and store the results of ALU operations, a local cache and a control unit that fetches instructions from memory via the local cache of the core and "executes" them by directing the coordinated operations of the ALU, registers and other components.

A "GPU" or "graphics processor" as used herein is a specialized electronic circuit designed to rapidly manipulate and alter memory to accelerate the creation of images in a frame buffer intended for output to a display. GPUs are used in embedded systems, mobile phones, personal computers, workstations, and game consoles. Modern GPUs are very efficient at manipulating computer graphics and image processing, and their highly parallel structure makes them more effective than general-purpose CPUs for algorithms where processing of large blocks of visual data is done in parallel. In a personal computer, a GPU can be present on a video card, or it can be embedded on the motherboard or on the CPU die.

An "exclusive write permission" as used herein is permission information indicating that a particular processor core has exclusive write permission in respect to a particular memory line contained in a local cache of said particular processor core. That a processor core has exclusive write permissions implies that the local cache operatively coupled to said processor has an up-to-date copy of said particular memory line, while any of the other local caches may not have exclusive write permission. The other local caches may or may not have an up-to-date or outdated copy of said particular memory line. It is possible that said other local caches do not have a copy or have an outdated copy of said memory line.

An "up-to-date" copy of a memory line is a copy of the data of a particular memory line stored in a local cache for which the cc protocol guarantees that in the system there does not exist a local cache having a more up-to-date version of said memory line.

An "outdated" memory line is a copy of a particular memory line in a local cache for which another copy exists in another local cache that is more up-to-date than the "outdated" memory line copy, e.g. because of a more recent write operation performed on the memory line copy in said other local cache.

A "coherence directory", "cDir" or "probe filter" as used herein is a hardware and/or firmware component configured to act as a filter through which the each processor core of a multi-core processor system must ask permission to load a cache line from the main memory to its respective local cache for ensuring cache consistency. A cDir is operatively coupled to one or more local caches and tracks whether a copy of a particular memory line is stored ("cached") in one or more of the local caches.

A "coherence directory table", "coherence table" or "cDir table" as used herein is a tabular data structure used by a coherence directory to store information on which memory lines are currently loaded to one or more local caches. According to embodiments of the invention, the cDir only tracks the lines which are exclusive write to a single local cache, while some state of the art cDir tables are in addition indicative of which ones of the memory lines cached in one or more local caches coupled to the cDir have up-to-date copies of a particular memory line.

A "cache" or "local cache" as used herein relates to a memory including one or more memory chips on or close to a processor or processor core. A "cache" typically operates with lower latency or higher bandwidth than the much larger main memory. Most CPUs since the 1980s have used one or more caches, and modern high-end embedded, desktop and server microprocessors may have multiple different caches, each specialized for a specific function. Examples of caches with a specific function are the D-cache and I-cache (data cache and instruction cache). A cache may reduce latency time of a request of a particular processor or processor core by determining, in response to said request, if the local cache of said processor or processor core includes the requested memory line or not for avoiding retrieving a copy of said memory line from main memory or another local cache). A memory line that is "dirty" with respect to memory is a memory line from which a cache has a copy in the "owned" state that is more up-to-date than the memory line in the main memory.

A "memory line" is a piece of data of fixed size that is transferred between memory and a local cache of a processor or processor core. When a cache line is copied from memory into the cache, a cache entry (or "memory line copy") is created. The cache entry will include the copied data as well as the requested memory location (also referred to as "memory line address" or "tag"). When a processor needs to read or write a location in main memory, it first checks for a corresponding entry in its local cache. The local cache checks for the contents of the requested memory location in any cache entry that might contain that memory line address.

A "cache miss" as used herein indicates an event of a processor or processor core trying to perform a requested read or write operation on a particular memory line in a local cache of said processor or processor core that could not be executed. For a read request, the reason for said request not being executable is that the requested memory line is not contained in ("cached in") the local cache of said processor or processor core. For a write request, the reason for said request not being executable is that the requested memory line is not contained in ("cached in") the local cache of said processor or processor core or that said processor or processor core lacks the exclusive write permission for said particular memory line.

A "cache hit" as used herein indicates an event of a processor or processor core trying to perform a requested read or write operation on a particular memory line in a local cache of said processor or processor core that could be executed. For a read request, a copy of the requested memory line is in this case contained in the local cache of said processor or processor core. For a write request, the requested memory line is contained in the local cache of said processor or processor core, the processor or processor core having the exclusive write permission for said particular memory line.

In the case of a cache hit, the processor immediately reads or writes the data in the cached memory line. For a cache miss, the cache allocates a new entry and fills the entry in cooperation with the coherence directory. Then the request is fulfilled from the contents of the cache.

A "thread" as used herein is a software thread, i.e., a segment of computer program code. In a multi-processor system, multiple software threads can be executed concurrently.

FIG. 1a depicts a system 101 including a first processor core 102 and a first local cache 106. The first local cache is operatively coupled to the first processor core for caching memory lines to be accessed by the first processor core. The first local cache includes first permission information indicating to which ones of the memory lines cached in the first local cache the first processor core has exclusive write permission.

The computer system further includes a second processor core 104 and a second local cache 108. The second local cache is operatively coupled to the second processor core for caching memory lines to be accessed by the second processor core. The second local cache includes second permission information indicating to which ones of the memory lines cached in the second local cache the second processor core has exclusive write permission.

The computer system further includes a main memory 150 operatively coupled to the first and the second local cache to provide memory lines to the first and the second local caches. The computer system further includes a cDir, cDirA 112. The coherence directory is a firmware and/or hardware unit configured for ensuring that the first and second processor cores, each via its respective local cache, access the same sequence (or an ordered subset of the sequence) of data values written by the first or second processor core to a particular memory line of main memory 150. For example, the main memory may include one or more memory chips, e.g. DRAM chip 100 and further DRAM chips. The main memory may include a set of memory lines storing payload data and executable data of an application program that is currently executed on the first and/or second and optionally further processor cores. The section of the main memory currently allocated to say application program is indicated as "application memory 116".

The system 101 may further include a page table 149. A page table is the data structure used by a virtual memory system in a computer system to store the mapping between virtual addresses and physical addresses of memory lines. When a process requests access to a data in a particular virtual memory line, it is the responsibility of the virtual memory system to map the virtual address provided by the process to the physical address of the actual memory where that data is stored. The page table is specified by the operating system by storing its mappings of virtual addresses to physical addresses, with each mapping also known as a page table entry (PTE). A "page", "memory page", or "virtual page" is a fixed-length contiguous block of virtual memory, described by a single entry in the page table. It is the smallest unit of data for memory management in a virtual memory system. Virtual memory allows a page that does not currently reside in main memory to be addressed and used. A program addressing the memory has no knowledge of a page fault or a process following it. Thus a program can address more (virtual) RAM than physically exists in the computer. Virtual memory is a scheme that gives users the illusion of working with a large block of contiguous memory space (perhaps even larger than real memory), when in actuality most of their work is on auxiliary storage (disk). Fixed-size blocks (pages) or variable-size blocks of the job are read into main memory as needed.

The cDirA 112 may selectively manage cache coherence for memory lines contained in a particular memory chip, e.g. chip 100. The coherence directory is, for example, configured for recording, in a coherence table, whether the first or second or neither local cache has the exclusive permission to write a data value.

The first and second processor cores are connected to each other via an inter-processor-core fabric 110, e.g. a system bus, a crossbar switch or on-chip mesh network. The computer system 101 may be, for example, a SMP system allowing all processor cores to work on any task no matter where the data for that task are located in memory. SMP systems can easily move tasks between processors to balance the workload efficiently.

The coherence directory may receive a request from the first processor core 102 to perform a read or write operation on a particular memory line which missed in the first local cache. In response to the receiving of the request, the cDirA 112 determines if the second local cache 108 (or any other local cache of the system 101 connected to the memory chip including the requested memory line, if any) includes a copy of the particular memory line and has exclusive permission to write to said copy contained in said second local cache. Based on the determination returning TRUE (in respect to the second processor core), the cDirA 112 performs a method. The method includes determining if the requested operation is a read or a write operation. The method includes requesting the second local cache to remove the exclusive write permission of the second processor core for the copy of the particular memory line from the second permission information. The method includes requesting the second local cache to write the up-to-date data contained in said copy to the main memory, and retrieving the up-to-date data from the main memory and storing the retrieved up-to-date data to the first local cache.

The method performed by the coherence directory further includes, based on the requested operation being a write operation, updating a coherence table of the coherence directory and the first permission information to respectively indicate that the first processor core has exclusive write permission on the provided up-to-date data in the first local cache. The provided "up-to-date data" of a memory line may also be referred to as the "up-to-date copy" of the memory line. Based on the requested operation being a read operation, the coherence directory updates the coherence table to indicate that none of the processor cores of the computer system has exclusive write permission on the particular memory line. The first permission information including permission information in respect to the memory lines contained in the first local cache may be maintained unmodified in this step.

Thus, the cDir according to embodiments of the invention handles cache misses of write requests in a different way than cache misses of read requests and delegates the responsibility to ensure that only up-to-date copies of a requested memory line is read by a software program to the software program itself.

Figure 2:
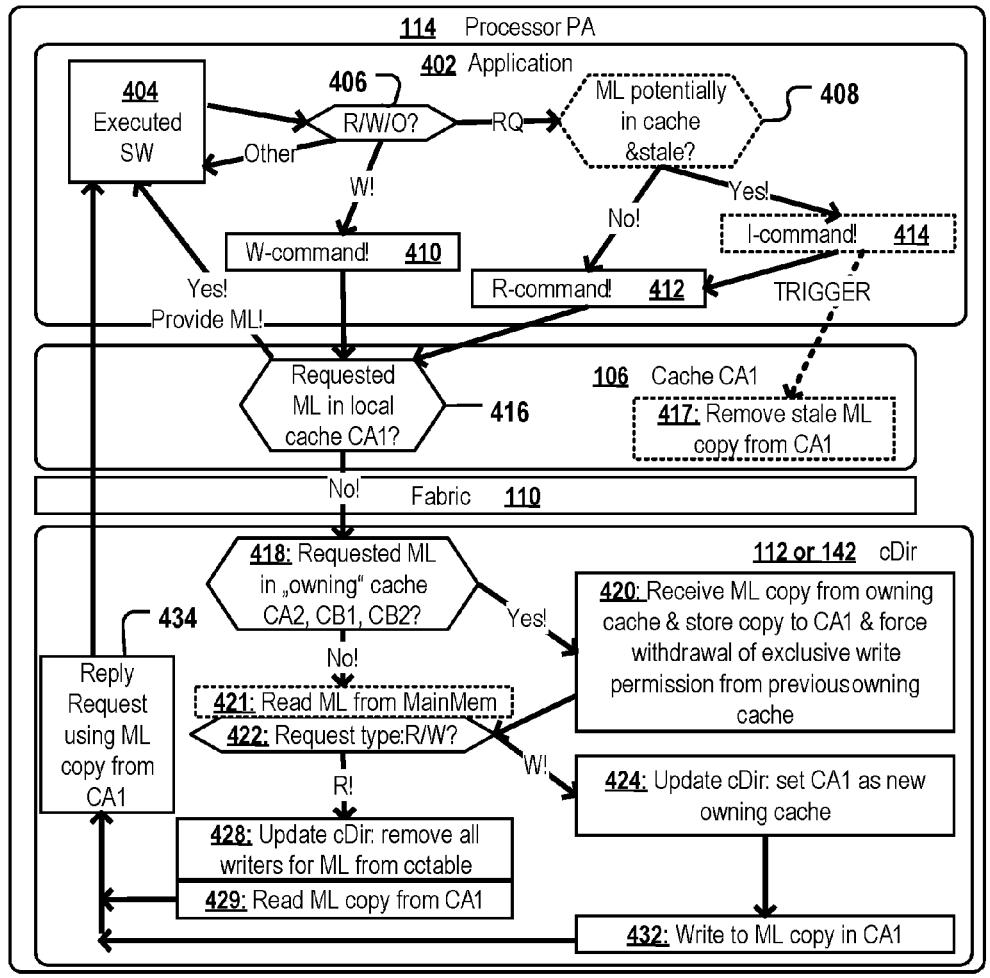
FIG. 2 depicts a block diagram of a cache coherence protocol relying both on computer program logic and on a cache coherence directory according to embodiments of the disclosure.
Figure 7:
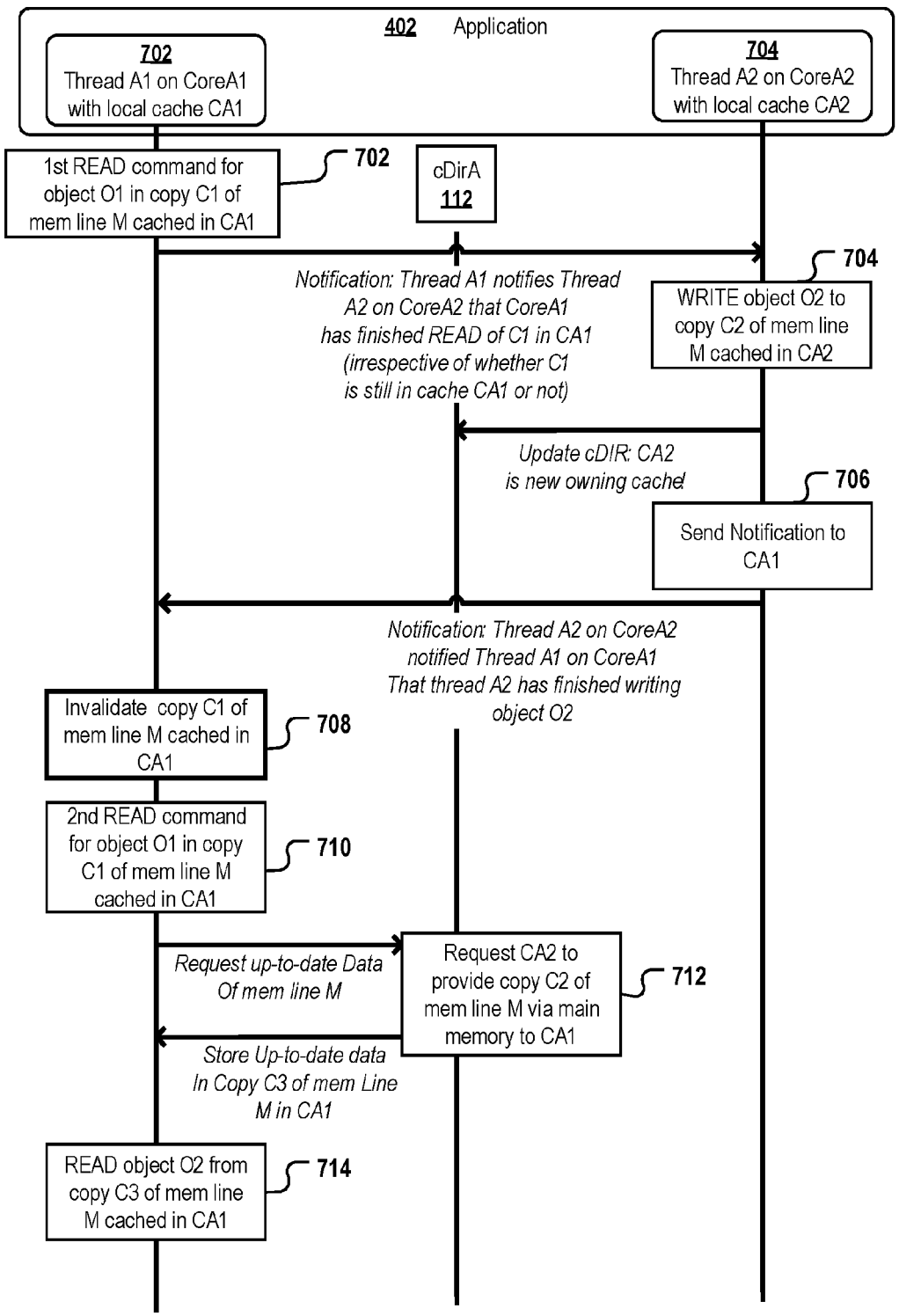
FIG. 7 depicts a flowchart of operations of a cc-protocol performed by concurrently executed computer program software threads according to embodiments of the disclosure.

According to embodiments, the computer system further includes a software application program (software) 402 running on the first and second processor cores. Examples of said software and how it interoperates with the cDir are depicted in FIGS. 2 and 7.

In response to receiving a request from the first processor core to perform a read operation on a particular memory line that is cached in the first local cache (e.g., in case of a "cache hit" for a requested read operation), the coherence directory according to embodiments of the invention allows the first processor core to read said cached memory line from the first local cache irrespective of permission information in the coherence table. The coherence directory relies on the application program to ensure that the particular memory line cached in the first local cache includes up-to-date data when the first processor core performs the requested read operation. Thereby, the first local cache may ignore whether or not the particular memory line cached in the first local cache is up-to-date or is outdated due to a write operation of another processor core on another copy of said memory line stored in the local cache of said other processor core. The application program is configured for invalidating 414, before requesting the first processor core 102 to perform the read operation on said particular memory line cached in the first local cache, a potentially outdated memory line being cached in the first local cache. Thus, the software is responsible for cache consistency of data read during a read operation while the cDir is responsible that the up-to-date copy of a memory line is written back to memory before a subsequent requested write operation is performed on a local copy of said up-to-date copy of the memory line.

In response to receiving a request from the first processor core to perform a write operation on a particular memory line that is cached in the first local cache (e.g., in case of a "cache hit" for a requested write operation), the first local cache allows the first processor core to write to said cached memory line in the first local cache, thereby keeping the second permission information and the coherence table unmodified. The application program is configured to invalidate 414, before requesting the second processor core to perform a read operation on said particular memory line being cached in the second local cache, a potentially outdated memory line being cached in the second local cache.

According to embodiments, the coherence table and the first permission information selectively includes addresses of memory lines cached in the first local cache for which the first processor core has exclusive write permissions. The coherence table lacks addresses of memory lines cached in the first local cache for which the first processor core lacks exclusive write permissions.

Said features may have the advantage that the size of each row of the coherence table is reduced. Furthermore, the number of entries in the cDir can be reduced, since the cDir does not track lines in the caches with read permission. Likewise, given a particular size of the coherence table, the caching of a larger number of memory lines in the first local cache can be monitored and controlled, as no cDir space is consumed by the addresses of memory lines cached in the first local cache for which the first processor core lacks exclusive write permissions. In prior art systems, metadata of said cached memory lines also had to be maintained in the coherence table in order to ensure that the read operations are always executed on up-to-date memory line copies. Embodiments of the invention delegate this task to the software that is currently executed on the processor cores.

According to some state-of-the-art local cache implementation variants, the cache may store state information for copy of a memory line cached. For example, according to the MESI protocol, the states "Modified", "Exclusive", "Shared" and "Invalid" may be stored. In case a particular cache operating according to the MESI protocol includes a "Modified" or "dirty memory line", that cache is responsible for eventually updating main memory. If no cache holds the line in the "owned" state, defined as "Modified" or "Exclusive", the memory copy is up to date. The cached memory line copy may not be written, but may be changed to the Exclusive or Modified state after invalidating all shared copies. If the memory line was "owned" before, the invalidate response will indicate this, and the state of the memory line copy will become Modified, so the obligation to eventually write the data back to memory is not forgotten. A "Shared" cached memory line copy may also be discarded (changed to the Invalid state) at any time. According to embodiments of the invention, state information may be tracked by the cDir only in so far as the one local cache being the "owner" of a particular memory line, i.e. "Modified" or "Exclusive", i.e., being operatively coupled to a processor or processor core having exclusive write permission on the memory line (cached in the owning local cache and optionally also non-owning in additional caches) is tracked, wherein the existence of copies of the memory line in all non-owning caches is not tracked ("recorded") by the cDir. Thus, the size of the cDir, in particular the cDir table, may be reduced.

According to embodiments, the coherence table lacks a column for storing the existence of a shared read copy of the memory line in any of the local caches and lacks a column for storing the identities of each local cache with a shared read copy of the cache line. Thus, each entry or row of the coherence table according to embodiments of the invention is significantly smaller than an entry or row in coherence tables of state of the art systems, thereby decreasing the size of the coherence directory table and/or increasing the total amount of memory lines whose caching status can be tracked by the coherence directory.

For example, a typical row in a state-of-the art coherence table uses about 100 bits, whereby 1 bit is needed for each memory line that has the status "shared" in multiple different local caches. According to embodiments, the rows of the coherence table may not include a "shared" bit but merely include rows for cached memory lines for which the respective processor core has the exclusive write permissions.

According to embodiments, the coherence table includes: 1) a first column including addresses ("tags") of memory lines cached in the first, second or any other local cache of the computer system; and 2) a second column including an identifier of the respective local cache including the cached memory line whose address is contained in the same row of the coherence table. Thereby, the assignment of a memory address and an identifier within a row indicates that the processor core operatively coupled to the identified local cache has exclusive write permission in respect to said cached memory line.

According to embodiments, the coherence table lacks rows used to assign memory addresses and local cache identifiers of local caches for which the processor core operatively coupled to the said local cache lacks exclusive write permission in respect to said cached memory line.

Cache entries (cached copies of a memory line) of state of the art caches usually have the following structure: tag|data block|flag bits. Typically, two or three flag bits are used—e.g. for the 4 states M, E, S, I of the MESI protocol mentioned above. Embodiments of the invention may use the same cache entry structure but may use a different coherence table structure, thereby reducing the size of the cache coherence table.

According to embodiments, the first processor core and the second processor core are one of: a CPU core, a GPU core or a FPGA core. In some embodiments, the first and second processor cores 102, 104 have the same processor core type, according to other embodiments, the first and second processor cores have a different processor core type. For example, the first processor core could be a CPU core and the second processor core could be a GPU core. Said features may be advantageous as they allow to take advantage of processing power provided e.g. by the GPUs of a graphic card in a computer to increase the processing speed of other, non-graphics related computational tasks.

The boxes SR1 and SR2 indicate memory pages mapped by a page table 149. An attribute bit of each page table entry may be set by the operating system to '0' or '1' in dependence on configuration data indicating a preference of an application program request for a particular operation mode of the cDir. The attribute bit accompanies each read or write request from a processor core, so that the cache coherence protocol followed by the cDir will follow, in dependence on said attribute bit value, in a hardware-only-cc-mode or in a hardwareWrite-softwareRead-cc-mode.

Figure 1B:
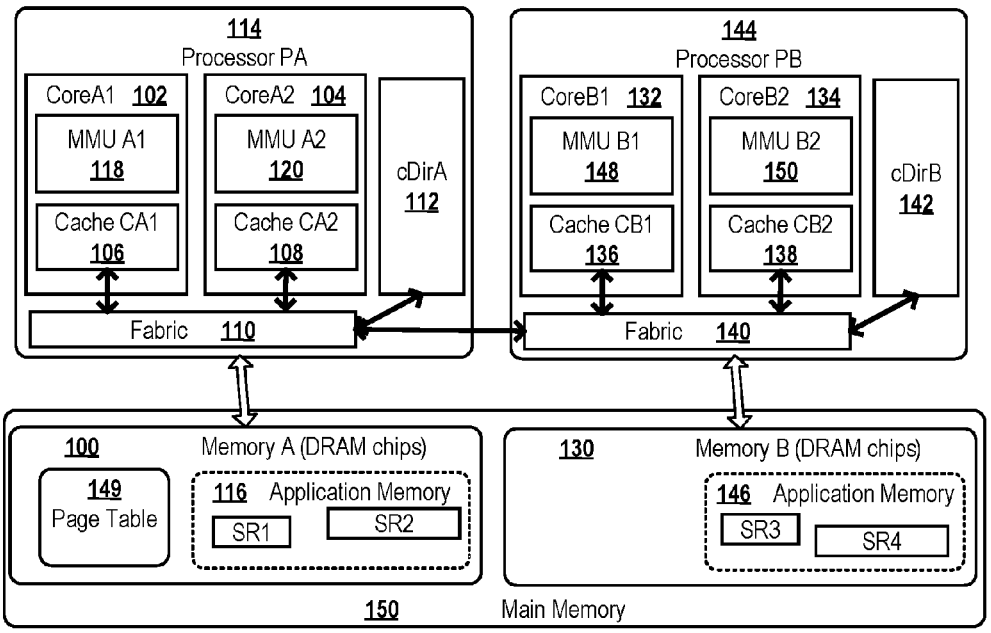
FIG. 1b depicts a system including multiple multi-core processors with respective local caches according to embodiments of the disclosure.

FIG. 1b shows a computer system including a first processor 114 and a second processor 144. The first and second processors are operatively coupled to each other via an inter-processor communication fabric. The first and the second processor are operatively coupled to the main memory 150, respectively.

The coherence directory, the first and second processor cores and the first and second local caches depicted in FIG. 1a and described in the above paragraphs are contained in the first processor. The second processor includes a third local cache 136, a third processor core 132, a fourth local cache 138, a fourth processor core 134 and a further coherence directory, cDirB 142. The third local cache is operatively coupled to the third processor core for caching memory lines to be accessed by the third processor core. The third local cache includes third permission information indicating to which ones of the memory lines cached in the third local cache the third processor core has exclusive write permission. The fourth local cache is operatively coupled to the fourth processor core for caching memory lines to be accessed by the fourth processor core. The fourth local cache includes fourth permission information indicating to which ones of the memory lines cached in the fourth local cache the fourth processor core has exclusive write permission.

The cDirA 112 of the first processor 114 is a firmware and/or hardware unit configured for ensuring that the first, second, third and fourth processor cores, each via its respective local cache, access the same sequence (or an ordered subset of the sequence) of data values written by the first, second, third or fourth processor core to a particular memory line of a first part 100 of the main memory 150. The first part of the main memory can be, for example, a particular DRAM chip.

The cDirB 142 of the second processor 144 is a firmware and/or hardware unit configured for ensuring that the first, second, third and fourth processor cores, each via its respective local cache, access the same sequence (or an ordered subset of the sequence) of data values written by the first, second, third or fourth processor core to a particular memory line of a second part 130 of the main memory 150. The second part of the main memory can be, for example, another DRAM chip. Thus, the cDirA 112 and the cDirB 142 are responsible for ensuring cache coherence on write requests for different, disjoint set of memory lines.

According to embodiments (where both the first and the second processor implement a request-type sensitive coherence protocol), in response to receiving a request from the third processor core for performing a read or write operation on a particular memory line of the second part 130 of the main memory 150, said particular memory line having been missed in the third local cache, the cDirB 142 determines if the first, second or fourth local cache is an owning local cache. An "owning local cache" is the one of the first, second or fourth local caches including a copy of said particular memory line and having exclusive permission to write to said copy contained in said owning local cache. Thereby, the exclusive permission indicates that said copy includes up-to-date data.

Based on the results of the determining returning TRUE, the cDirB 142 requests the owning local cache to remove the exclusive write permission of the respective processor core for the copy of the particular memory line from permission information associated with the owning local cache. The removal of the write permission may ensure that the processor core of the owning local cache does not update the memory line copy in the owning local cache before writing the up-to-date copy to the main memory. The cDirB 142 requests the owning local cache to write the up-to-date data contained in said copy to the main memory; retrieving the up-to-date data from the main memory and storing the retrieved up-to-date data to the third local cache.

Furthermore, the cDirB 142, based on the requested operation being a write operation, updates a further coherence table of the cDirB 142 and the third permission information to respectively indicate that the third processor core has exclusive write permission on the provided up-to-date data in the third local cache. Based on the requested operation being a read operation, the cDirB 142 updates the cDirB 142 coherence table to indicate that none of the processor cores of the computer system has exclusive write permission on the particular memory line. The third permission information may be kept unmodified. As the task of ensuring that a requested cache entry is up-to-date before permitting a read operation on said cache entry is delegated to the software, it is not necessary that the cDirB 142 updates the third permission information with data on the "owning" cache. Similarly, it is not necessary to maintain information on an "owning cache" in the coherence table. This may not only save storage space of the coherence table of the further cache coherence directory, cDirB 142, but also increases the performance of the cache access management as for the read requests, updates to the third permission information can be avoided. Said advantages likewise apply in respect to the omission of the updating of the first permission information by the first cache directory in response to read requests.

Said features may be advantageous, as the cDirA 112 of the first processor and the further coherence directory, cDirB 142 of the second processor both implement a request type (R/W) sensitive coherence protocol. Both processors and cDirs can easily be combined, thereby providing a multiprocessor system with accelerated and improved caching routines. Coherence can be ensured over multiple processors, processor cores and DRAM chips.

According to other embodiments (where only the first processor implements a request-type sensitive coherence protocol, the second processor implements a state of the art cache coherence protocol), the cDirB 142 is responsible for ensuring cache coherence both for read and write requests. The cDirB 142 is configured for checking, in response to receiving a request from the third processor core to perform a read or write operation on a particular memory line of the second part 130 of the main memory 150, said particular memory line having been missed in the third local cache, permission information stored in the further coherence table for ensuring that the first, second, third and fourth processor cores, each via its respective local cache, access the same sequence of data values written to said particular memory line cached in a respective one of the first, second, third and fourth local caches.

According to embodiments, the updating of the coherence table of the cDirA 112 to indicate that none of the processor cores of the computer system has exclusive write permission on the particular memory line includes deleting the coherence table row including the address of the particular memory line for which the first processor core 102 requested to perform a read operation and which was not cached in the first local cache. For example, at the moment of receiving the read request, the second cache may include an up-to-date copy of the requested memory line and the second processor core may have exclusive write permissions for said cache line. In response to the read request, the cDir may trigger the storing of the up-to-date copy in the main memory and the loading of the up-to-date copy into the first local cache. In addition, the cDir deletes the one row in the coherence table that indicates that the second local cache is the owning local cache (which is synonym to indicating that the second processor core has exclusive write permissions to the up-to-date copy of the memory line in the second local cache). Thus, after the delete operation, the coherence table lacks an entry for said particular memory line and none of the local caches has exclusive write permissions on a respective local copy of the requested memory line. Thus, upon any further read operation, the coherence table will not have to be updated and also the permission information maintained by the respective local caches is not updated by any further read request of the first processor to said memory line. The consistency of the data requested in this and all follow-up read requests is solely ensured by the software program.

According to some embodiments, the coherence directory is capable to operate in two different operation modes. On the one hand the cDirA 112 implements a hardware-only-cc-mode. In the hardware-only-cc-mode, the coherence directory checks, in response to receiving a request of the first processor core to read or write data from or to a memory line missed in the first local cache, read and write permission information in the coherence table for ensuring that the first and second processor cores, each via its respective local cache, access the same sequence of data values written by the first or second processor core to a particular memory line.

On the other hand, the coherence directory implements a hardwareWrite-softwareRead-cc-mode. In the hardware- Write-softwareRead-cc-mode, the coherence directory checks, selectively in response to receiving a request of the first processor core to perform a write operation on a particular memory line, permission information in the coherence table for ensuring that the first and second processor cores, each via its respective local cache, access the same sequence of data values written by the first or second processor core to a particular memory line. Thereby, the coherence directory relies on a software application executed on the first and second processor core to ensure that the read request does not read an outdated copy of said particular memory line from the first local cache.

Using a cDir that supports the two different operation modes may be advantageous as the cDir may flexibly react to different types of software, thereby easing the process of replacing software components that does not support the request-type sensitive coherence protocol (i.e., a software component that does not ensure coherence for read operations on its own) by a software component that supports the request type sensitive coherence protocols and thus can make use of the performance benefits of this approach. In a further beneficial aspect, in case multiple different software applications run on a particular computer system, some of them supporting the new coherence protocol while others don't, using a cDir capable of operating in both modes may allow to run software programs that can ensure that a read cache line is not outdated in the hardwareWrite-softwareRead-cc-mode and to run software programs that cannot ensure that a read cache line is not outdated in the hardware-only-cc-mode.

According to embodiments, the received request includes or is accompanied by a cc-mode bit. Upon receiving a request of the first processor core to perform a read or write operation on a memory line missed in the first local cache, the coherence directory identifies said memory line and evaluates the cc-mode bit of said request. Then, the coherence directory switches to hardware-only-cc-mode or hardwareWrite-softwareRead-cc-mode in dependence on the cc-mode bit value.

Using a cc-mode bit value may be beneficial as the use of an extra bit associated with each read or write request a particular memory line or with all memory lines of a memory page allows for a very fine grained, flexibly adaptable control of the cache coherence protocol applied. Moreover, the use of such extra-bits in a page table entry is supported by current processors and cache and memory architectures, so most of the components of a processor may be used without any adaptations in the request type sensitive cache coherence protocol.

According to embodiments, the coherence directory table in hardware-only-cc-mode includes entries respectively identifying a memory line that is cached in the first local cache and includes meta-data indicating if the memory line cached in the first local cache was created in response to a read operation request or a write operation request.

In hardwareWrite-softwareRead-cc-mode, each entry of the coherence directory table respectively identifies a memory line that is cached in the first local cache and that (by the cDir only recording write requests) implicitly indicates that the memory line cached in the first local cache was created in response to a write operation request. Thus each entry of the cDir table in this mode lacks meta-data indicating if the memory line cached in the first local cache was created in response to a read operation request or a write operation request.

For example, each coherence table entry (or "row") of a cDir operating in hardware-only-cc-mode identifies one or more (shared) readers or identifies a single exclusive writer. A "shared reader" is a local cache that includes an up-to-date copy of a particular memory line. An "exclusive writer" is the one single cache that includes an up-to-date copy of said memory line whose respective processor core is exclusively permitted to perform a write operation. To the contrary, each coherence table entry (or "row") of a cDir operating in hardwareWrite-softwareRead-cc-mode does not identify (shared) readers and may only identify a single exclusive writer. A write request to a particular memory line with the cDir being in hardwareWrite-softwareRead-cc-mode will result in an updated coherence table entry identifying the exclusive writer of said particular memory line. A read request in said mode will result in a deletion of the line identifying the prior exclusive writer of said particular memory line and thus will result in a coherence table having no entry for this particular memory line, since in said mode the cDir does not record reader(s). In this mode, the software running on the first and second processor cores has to ensure that each memory line is accompanies by a cc-mode value indicating that the cDir operates in hardwareWrite-softwareRead-cc-mode.

According to embodiments, the first processor core 102 is operatively coupled to a first memory management unit 118. The second processor core is operatively coupled to a second memory management unit 120. The first memory management unit (MMU) is configured for receiving cc-mode configuration data from a page table entry shared by the first and second processor cores. The cc-mode configuration data is indicative that an operating system or an application program currently executed on the first and second processor cores configures the first MMU to operate, when processing a memory page SR1 identified by the page table entry, in hardwareWrite-softwareRead-cc-mode rather than in hardware-only-cc-mode. In response to receiving the cc-mode configuration data, the first MMU assigns a first cc-mode bit value to each read request or write request directed at a memory line within said memory page. The assignment is by the first MMU unit during a virtual-to-physical address resolution operation for said memory page.

For example, the cc-mode configuration data may be specified in a SRmalloc( ) command used by an application program implemented in C+ programming language. For example, the cc-mode configuration data may specify hardwareWrite-softwareRead-cc-mode for the application instruction code executed by a processor, since that is typically read-only during the application execution.

The first cDirA 112 is configured to switch to the hardwareWrite-softwareRead-cc-mode upon processing memory lines having assigned the first cc-mode bit value. The second MMU 120 depicted in FIG. 1a and optionally also the third and fourth MMUs 148, 150 depicted in FIG. 1b may likewise be configured to assign cc-mode bit values during a virtual-to-physical mapping in response to receiving said cc-mode configuration data from a page table entry shared between the first and second processor core or shared between the third and fourth processor core.

Specifying the cc-mode bit by the MMUs in dependence on configuration data during the address translation may be advantageous, as said approach involves only very small amount of additional "handling costs" for specifying the modes. During address translations, the address information of cache lines and additional cache line bits are processed and set anyway, so must current MMUs already come with the necessary functionality for setting bit values of memory line copies to be loaded into a particular cache in dependence on some dynamically determined data. Thus, existing functionalities can now be used for a novel purpose, i.e. a flexible switching of the cDir coherence protocol at runtime of an application program or at runtime of the operating system.

FIG. 2 depicts a software application program 402 that is configured to make use of the request-type sensitive cache coherence protocol implemented in a coherence directory, cDirA 112 and cDirB 142, according to embodiments of the invention. The software may be provided, for example, in the form of a computer readable storage medium, e.g. a DVD, a USB-drive, a hard disc drive, FLASH drive, a magneto-optical drive, an electromagnetic data carrier, or the like. The software may support parallelization, i.e., may be executable in two or more threads running in parallel on different processors or processor cores.

For example, a first program thread may be executed on a first processor core 102 and a second program thread may be executed on a second processor core 104 of a computer system 101 including a first local cache 106 operatively coupled to the first processor core and a second local cache 108 operatively coupled to the second processor core, a main memory and a cDirA 112 as described, for example, in FIGS. 1a and 1b.

The software application program 402 may be configured to execute 404 a first program thread on the first processor core. Said program thread includes a request for accessing a particular memory line ("ML"). In a decision step 406, the software determines if a said request to be executed is a read or a write request.

In case the software determines in step 406 that the request is a write request (or "write command"), the software immediately (i.e., without issuing an invalidation command) executes 410 the request. The first processor core tries in step 416 to fetch the requested memory line from the first local cache 106.

In case of a cache hit, the requested memory line is read from the first cache (not shown) and the thread execution continues in step 404.

In case of a cache miss, the request to write to said memory line is communicated via the fabric 110 to the cDirA 112 or cDirB 142 (depending on which one of the cDirs is responsible for managing the cache coherence of the requested memory line) for determining in step 418 if the requested memory line is contained exclusive in any of the other local caches, e.g. the second, third or fourth local caches, if any. If yes, the cDirA 112 or cDirB 142 in step 420 receives a copy of the requested memory line from the owning cache and stores said copy to the first local cache. Moreover, the cDir removes an entry indicating the previous owning local cache from the cDir table and triggers the owning local cache to give up the exclusive permission.

If the requested cache line is not contained exclusive (as an up-to-date copy) in any of the other local caches, the cDirA 112 or cDirB 142 reads an up-to-date copy of the requested memory line from the main memory in step 421. Thereby, two different mechanisms ensure that the copy in the first local cache is up-to-date: in case the request is a read request, the software in step 408 checks if the first local cache might include an outdated copy of the requested memory line and in this case invalidates 414 said outdated copy. Thus, even in case the cDir table should lack an entry for an owning cache of the requested memory line, the software in steps 408 and 414 ensures that the ML copy in the first cache read in step 429 is up-to-date (invalidation of a copy of a memory line in a cache implies that an up-to-date copy of the memory line has to be loaded into said cache de novo). In case the request is a write request, the cDir table includes information on the owning cache/the exclusive writer, if any, and enable the cDir to load the up-to-date copy from said owning cache via the main memory to the first local cache. Each new write from a different core sets a new exclusive writer/owning cache entry in the cDir table.

In step 422, the cDir responsible for managing the cache coherence of the requested memory line (e.g. cDirA 112 or cDirB 142) determines in step 422 if the request is a read or a write request ("request type sensitive").

In case of a read request, the cDir in step 428 removes an entry in the coherence table of the cDir that was indicative of a previous writer/the previously owning local cache of the requested memory line. It may happen that the coherence table does not include such an entry, e.g. because said entry may have already been deleted upon a previous read request. So after step 428 is executed, and optionally already before said step, the coherence table lacks any information on a current writer (having exclusive write permissions)/currently owning cache and lacks information if and in which one of the local caches there exists an up-to-date or outdated copy of the requested memory line. Then, in step 429, the first processor core reads a copy of the requested memory line from the first local cache that is returned in step 434 from the first local cache to the first processor core in reply to the request.

As can be read from the sequence of steps 418, 421, 422, 428 and 429 for a read request, the cDir does not ensure that the copy of the memory line that is read from the first local cache, if any, and that is returned in response to the request is up-to-date. Rather, it is in the duty of the software to determine, in step 406, if a current request to access a particular memory line is a read request or a write request and to selectively 408 for read requests invalidate 414 outdated copies of the memory line in the first local cache. In case of a read request, the software and step 408 has to determine if the requested memory line is potentially in the first local cache and is "stale", i.e., is an outdated copy of the requested memory line. If the software determines that the first local cache does not include a copy of the requested memory line or determines that the first local cache includes a copy of the requested memory line that is up-to-date, the software directly executes the read request in step 412 on said up-to-date copy. The first local cache may include an outdated copy of the requested memory line. In case the software determines in step 408 that the first local cache may include an outdated copy of the requested memory line, the software in step 414 invalidates the memory line copy in the first local cache, e.g. using a dcbf command. The invalidation command causes the first local cache to invalidate (e.g. ignore or delete) the copy in step 417 in the first local cache (dotted arrow).

The determination step 408 may include, for example, that a first software thread executed on a first processor core checks if a notification of a second thread running on a second processor cure was received by the first thread. The notification may indicate that the particular memory line cached in the first local cache is potentially an outdated copy of said memory line. The determination steps 406 and 408 may be implicit in the overlying programming model, programming discipline or execution model used by the application. For example, a single-threaded application has an execution model which only can have stale cache lines due to actions by the operating system, input/output system or similar and these latter systems can issue the necessary invalidation commands to ensure that the single-threaded application sees no stale cache lines.

In case the cDir determines in step 422 that the request RQ is a write request, the cDir in step 424 updates the coherence table of the cDir accordingly by storing in said table the information that the first local cache is the new owning cache of the requested memory line, and storing information that the first local cache has become the new owning local cache (and thus, that the first processor core has exclusive write permissions in respect to the requested memory line ML) both in the permission information of the first local cache and in the coherence table of the cDir. In step 432, the requested write operation is performed on the ML copy in the first local cache and a confirmation on the successfully write operation is returned in step 434 to the software application program 402.

As can be read from the sequence of steps 418, 421, 422, 424 and 432 for a write request, the cDir updates the permission information of the previous and new owning local caches and the cDir table with information on the local cache/processor core being the new owning cache/new exclusive writer for a particular memory line.

According to embodiments, the software application program 402 selectively upon performing, by a first thread executed on the first processor core, a write operation on a particular memory line cached in the first local cache, relies on the cDir to ensure that the first processor core has exclusive write permissions on the memory line. Selectively for performing, by the first thread executed on the first processor core, a read operation on a particular memory line cached in the first local cache, the first thread checks, before performing said read operation, if a notification of the second thread was received by the first thread, the notification indicating that the particular memory line cached in the first local cache is potentially an outdated copy of said memory line. If the notification was received, the software invalidates in step 414, prior to said read operation, the particular memory line cached in the first local cache for ensuring that the read operation is performed on an up-to-date copy of the particular memory line in the first local cache in step 416. Thus, when the software executes the requested read operation, the read operation is performed 416 not on a potentially outdated copy of the particular memory line in the first local cache.

Figure 3:
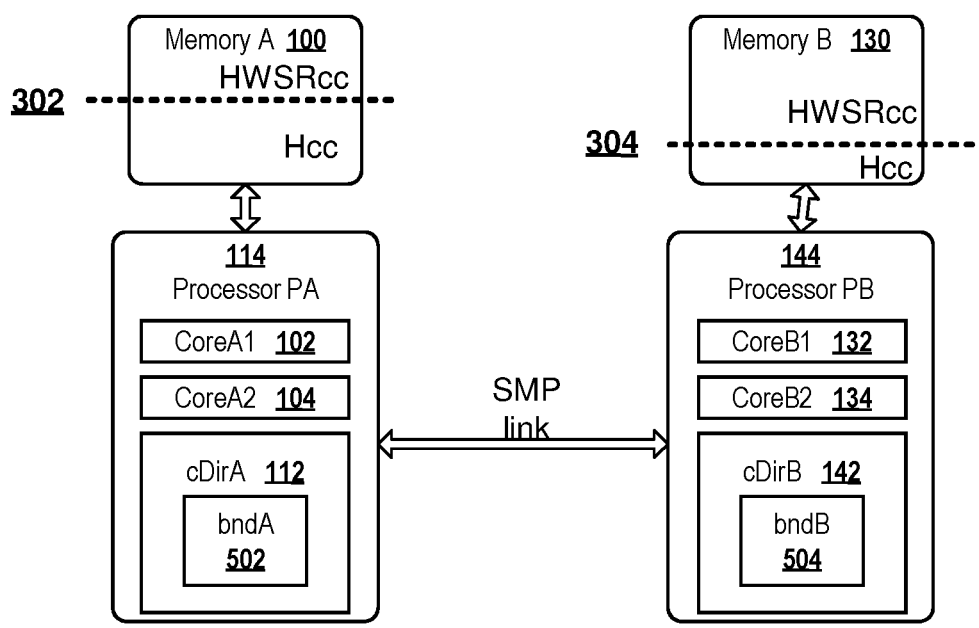
FIG. 3 depicts a threshold-based cache coherence protocol according to embodiments of the disclosure.

FIG. 3 depicts an embodiment where a memory may include memory lines cached in two different fashions (or "modes"): first ones of the memory line having a cc-mode bit value which indicate that the cache coherence should be controlled by a cDir operating in hardwareWrite-softwareRead-cc-mode and second ones of the memory line having a cc-mode bit value which indicate that the cache coherence should be controlled by a cDir operating in hardware-only-cc-mode. If a particular memory line is one of the first or of the second memory lines may depend on a threshold for the sequence number of said memory line. According to some embodiments, different parts of the main memory, e.g. different memory chips 100, 130 may have assigned different threshold values for the memory line sequence number. For example, the cDirA 112 may include a configurable first threshold value 502 that splits the memory lines of memory chip 100 as illustrated by the dotted threshold line 302. The further cDirB 142 may include a configurable second threshold value 504 that splits the memory lines of memory chip 130 as illustrated by the dotted threshold line 304.

According to embodiments, the cDirA 112 identifies a threshold cache line number 502, the threshold cache line number being between "0" and the total number of memory lines whose coherence is controlled, at least for write request, by the coherence directory. The cDirA 112 assigns a first cc-mode bit value to each memory line of said total number of memory lines whose sequence number is equal to or larger than the threshold cache line number. The cDirA 112 assigns a second cc-mode bit value to each memory line of said total memory lines whose sequence number is smaller than the threshold cache line number. The cDirA 112 switches to the hardwareWrite-softwareRead-cc-mode selectively upon processing cache lines having assigned the first cc-mode bit value.

A "sequence number" of a memory line may be any ordered number identifying a particular memory line in its respective memory chip. For example, the sequence number may be a combination of a TAG, SET, and OFFSET field of a main memory address. The higher the preference of the OS/the software for performing the inventive hardwareWrite-softwareRead-cc-mode, the lower the cache line threshold used for functionally splitting the cache.

Said features may be beneficial as a coarse-grained but nevertheless effective method of reducing the resource consumption of cache coherence is provided. For example, the threshold may be configured thus that the fraction of memory lines to be processed in hardwareWrite-softwareRead-cc-mode and memory lines to be processed in hardware-only-cc-mode are adapted to the requirements of the totality of software programs that currently run on the computer system. Thus, in case some software programs support the new cache coherence protocol while others don't, the threshold will be chosen such that both types of software programs will be allocated a sufficiently large portion of the main memory (and thus, a sufficiently large number of memory lines) whose assigned cc-mode bit causes the cDir to operate in the cache coherence mode that is supported by the respective software programs.

According to preferred embodiments, the operating system is capable of automatically identifying the total amount of main memory required by the totality of software programs currently running on the computer system, and of automatically configuring the thresholds 502, 404 of respective cDirs in a way that at least said identified total amount of required main memory is assigned a cc-mode bit causing the cDir to operate in hardwareWrite-softwareRead-cc-mode.

According to embodiments, the cDirA 112 is configured for receiving cc-mode configuration data from an operating system of the computer system 101 or from a software application program 402 currently executed by the first processing core. The cc-mode configuration data is indicative that the operating system or the application program prefers the first coherence directory to operate in hardwareWrite-softwareRead-cc-mode rather than in hardware-only-cc-mode. In response to receiving the cc-mode configuration data, the coherence Directory is configured to perform the identification of the threshold cache line number. Thereby, the magnitude of the threshold cache line number negatively correlates with the strength of preference for the hardwareWrite-softwareRead-cc-mode.

Figure 4:
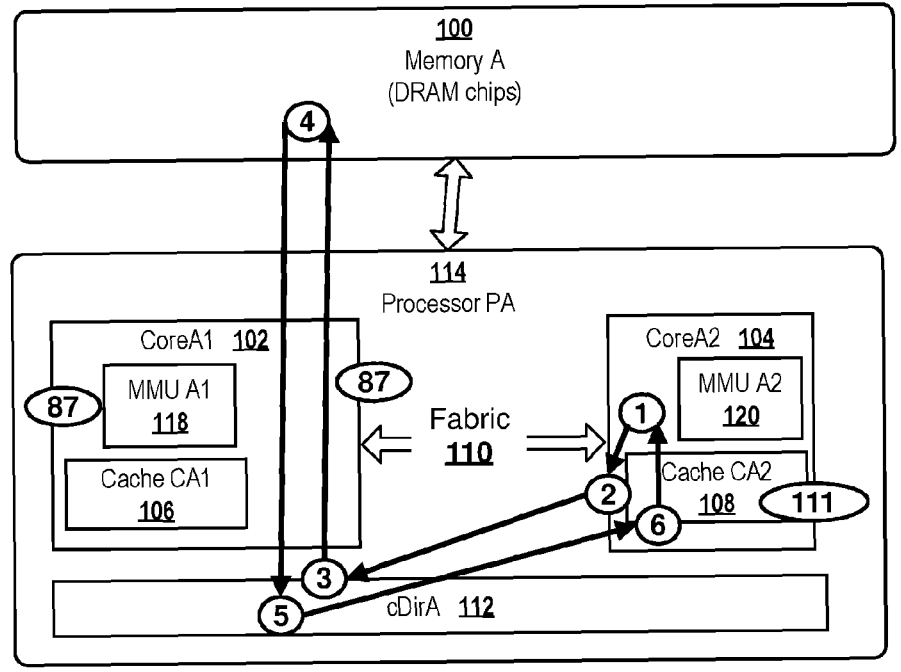
FIG. 4 depicts information flow in a cc-protocol operating on a multi-core processor according to embodiments of the disclosure.

FIG. 4 depicts information flow in a cache coherence ("cc")-protocol operating on a multi-core processor according to embodiments of the invention. It shows the numbers "1"-"6", respectively representing steps to be performed by or at the respective system components, whereby at least some of said steps are performed differently for read and a write requests. The components may be components of a processor chip of a computer system such as depicted, for example, in FIG. 1a. Numbers "87" and "111" represent later steps of later read or write request described for illustrative purposes only. The first 102 and second 104 processor cores are contained on the same processor 114 and cached data is exchanged via an intra-processor communication fabric 110.

In case a write operation is requested from the second processor core, the following steps 1-6 may be executed according to embodiments of the invention:

Step 1: the software application program 402 requests the second processor core 104 to perform a write operation on a particular memory line that is owned by the first local cache 106.

Step 2: the second local cache determines that the particular memory line is not cached in the second local cache.

Step 3: the cDirA 112 requests the first local cache (i.e., the current owning cache of the particular memory line) to store its up-to-date copy of the particular memory line in the main memory and updates the cDir coherence table to specify that the second processor core has exclusive write permissions in respect to the particular memory line.

Step 4: the cDir causes the second local cache to load said up-to-date copy of the particular memory line from the main memory into the cDir.

Step 5: the cDir provides loaded up-to-date copy to the second local cache.

Step 6: the second local cache stores the provided up-to-date copy and second processor core performs the requested write operation on the up-to-date copy stored in the second local cache. [ . . . ].

Step 87: in case in a later step 87 the first processor core is requested to write to said particular memory line, said request triggers the cDir to flush the exclusive copy of the particular memory line in the second local cache.

In case a read operation is requested from the second processor core:

Step 1: the software application program 402 requests the second processor core 104 to perform a read operation on a particular memory line.

Step 2: the second local cache determines that the particular memory line is not cached in the second local cache; for example, an invalidation command issued by a software thread executed on the second processor core may have invalidated, e.g. flushed any outdated copy of said particular memory line in the second local cache.

Step 3: the cDirA 112 requests the first local cache (i.e., the current owning cache of the particular memory line) to store its up-to-date copy of the particular memory line in the main memory; thereby, the cDir does not update its coherence table to indicate that the second processor is a new (shared) reader of said particular memory line. Rather, the cDir updates its coherence table to specify that none of the processor cores associated with the main memory of the system has exclusive write permissions in respect to the particular memory line.

Step 4: the cDir causes the second local cache to load said up-to-date copy of the particular memory line from the main memory into the cDir.

Step 5: the cDir provides loaded up-to-date copy to the second local cache.

Step 6: the second local cache stores the provided up-to-date copy and second processor core performs the requested read operation on the up-to-date copy stored in the second local cache. [ . . . ].

Step 87: in case in a later step 87 the first processor core is requested to write to said particular memory line, the coherence table of the cDir will not indicate any of the local caches to be the owning local cache; So the cDirA 112 will in this case not trigger the flushing of the copy of the particular memory line in the second local cache. Thereby, computational resources are saved.

Step 111: in case in an even later step 111 the second processor core is requested to read the particular memory line after the first processor core wrote an up-to-date copy of the particular memory line in the first local cache, a software thread executed on the second processor core must invalidate (e.g. flush) the outdated copy of said line in the second local cache to force the second local cache to load the up-to-date copy from the first local cache via the main memory into the second local cache.

Figure 5:
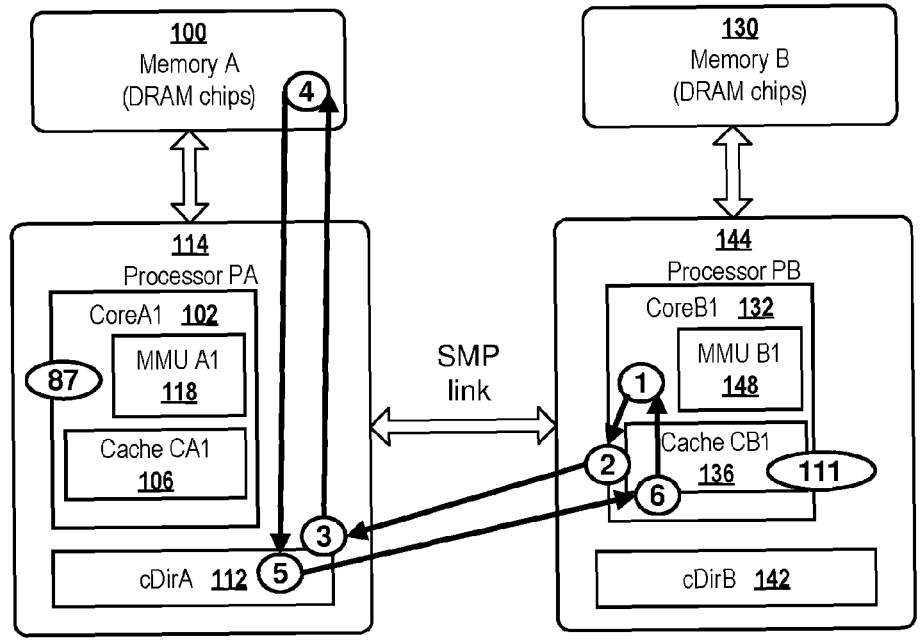
FIG. 5 depicts information flow in a cc-protocol operating on a multi-processor system according to embodiments of the disclosure.

FIG. 5 depicts information flow in a cache coherence ("cc")-protocol operating on a multi-core processor according to embodiments of the invention. It shows the numbers "1"-"6", respectively representing steps to be performed by or at the respective system components, whereby at least some of said steps are performed differently for read and a write requests. The components may be components of a processor chip of a computer system such as depicted, for example, in FIG. 1b. Numbers "87" and "111" represent later steps of later read or write request described for illustrative purposes only.

The steps of FIG. 5 are identical to the steps described in FIG. 4 with the only difference that a processor core 132 of another processor 144 takes over the role of the "second processor core" 104. The first 102 and second 104 processor cores are contained on different processors 114, 144 and cached data is exchanged via an inter-processor communication fabric, e.g. an SMP link.

Figure 6:
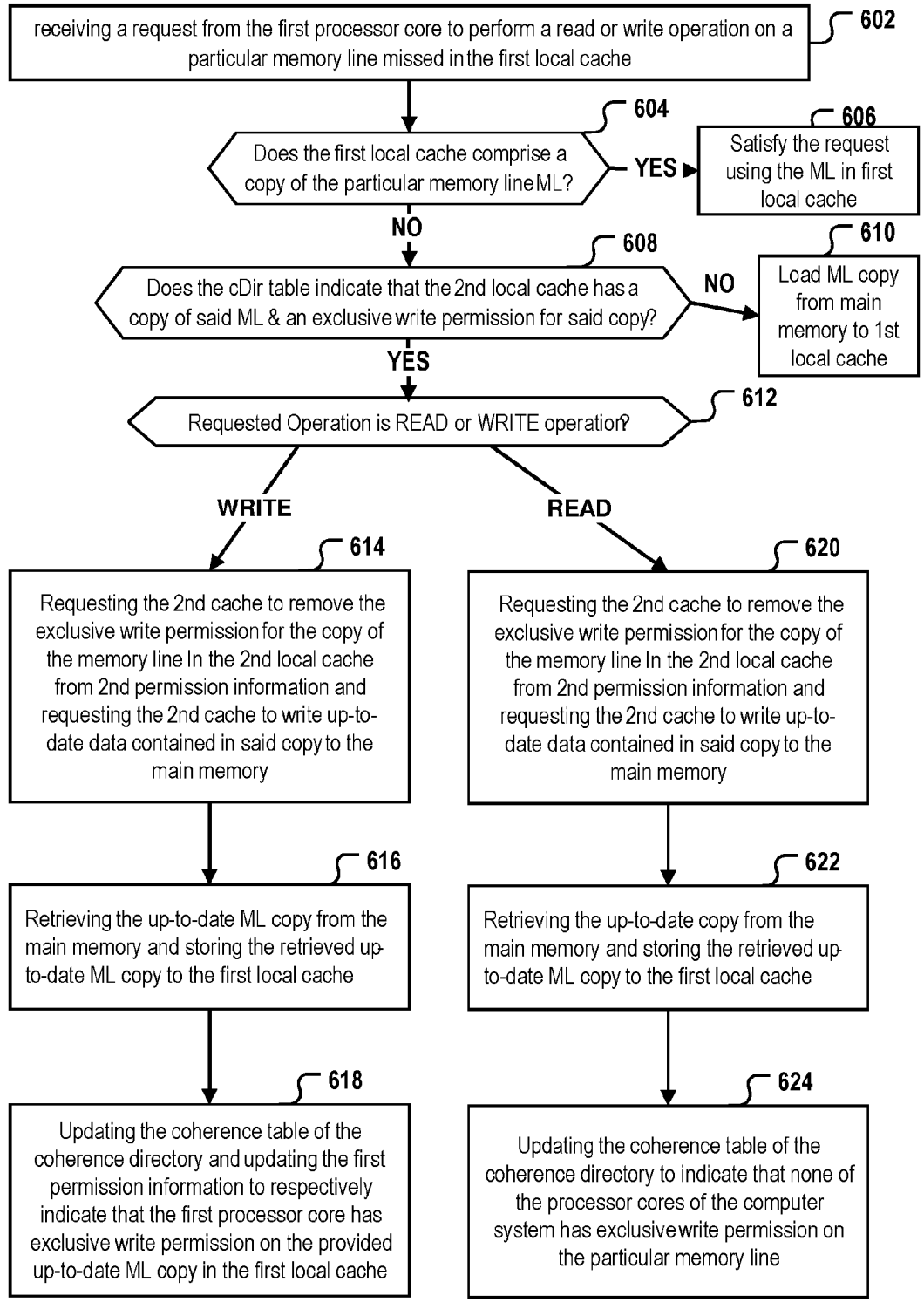
FIG. 6 depicts a flowchart of operations in a cc-protocol performed by a coherence directory according to embodiments of the disclosure.

FIG. 6 depicts a flowchart of operations in a cc-protocol performed by a first local cache and a coherence directory according to embodiments of the invention. In a first step 602, a first local cache receives the request from a first processor core 102 to perform a read or write operation on a particular memory line ML. In case of a read, in step 604, the coherence directory checks if the ML is contained in the first local cache. If so, said copy is accessed in step 606 by the first processor core and the requested read operation is performed on said copy. In case of a write, in step 604, the coherence directory checks if the ML is contained in the first local cache and if the first local cache holds the exclusive write permission for the ML. If so, said copy is accessed in step 606 by the first processor core and the requested write operation is performed on said copy. According to preferred embodiments, the coherence table of the coherence directory lacks information on (shared) readers, i.e., lacks information on whether or not a particular local cache includes an up-to-date copy of a particular memory line. Therefore, the step 604 is performed by the first local cache without any additional checking step that accesses information in the coherence table or in other local caches to ensure that the copy of the requested memory line contained in the first local cache is up-to-date. Rather, in step 604, the first local cache relies on logic of the software application program 402 invalidating and removing, by issuing an invalidation command 414, any outdated memory line ("ML") copy in the first local cache.

In case the first local cache does not include a copy of the particular memory line, the first local cache sends a request to the coherence directory, the coherence directory in step 608 determines if another local cache, e.g. the second local cache, is listed in the coherence table of the cDir as an owning local cache whose respective processor core has exclusive write permissions on that ML copy in that local cache. For example, in case in step 608 it is determined that the cDir table indicates that the second processor core 104 has no exclusive write permissions for said copy, the coherence directory in step 610 loads a copy of the requested ML from the main memory to the first local cache. Otherwise, the coherence directory proceeds to step 612 and determines if the requested operation is a read or write operation.

In case the requested operation is a write operation, steps 614, 616 and 618 are executed by the cDirA 112. In case the requested operation is a read operation, steps 620, 622 and 624 are executed by the cDirA 112.

In step 614, cDirA 112 requests the owning local cache (here: the second local cache) to remove the exclusive write permissions for the second processor core in respect to the requested memory line from permission information being part of or associated with the owning (here: the second) local cache and triggers the second local cache to write its up-to-date copy of the requested ML to the main memory. Then, in step 616, the cDir retrieves an up-to-date ML copy from the main memory and stores the retrieved up-to-date finally, in step 618, the cDir updates its coherence table and the permission information being part of or associated with the first local cache (the new owning cache) to indicate that the first local cache is the new owning cache of the memory line and that the first local processor core has exclusive write permissions in respect to that memory line ML.

In step 620, the cDir also requests the second local cache to remove the exclusive write permissions of the permission information associated with that the second local cache and request the second local cache to write the up-to-date copy of the memory line to the main memory. In step 622, the cDir retrieves the up-to-date ML copy from the main memory and loads it into the first local cache. In step 624, the cDir updates its coherence table as to indicate that none of the local cache is associated with the main memory is an owning cache in respect to the memory line ML.

FIG. 7 depicts a flowchart of operations of a cc-protocol performed by concurrently executed software threads according to embodiments of the invention. According to the embodiment depicted in FIG. 7, a software application program 402 includes at least a first thread "A1" 702 executed on a first processor core CoreA1 102 and at least a second software thread "A2" 704 concurrently executed on a second processor core CoreA2 104. For example, the first and second processor cores may be the first and second processor cores of a system depicted, for example, in FIG. 1a or 1b. Instead of the processor core 104, also the processor core 132 of a different processor could be used as the second processor core CoreA2 according to embodiments of the invention. For the sake of simplicity, the following example will be described by making reference to the system depicted in FIG. 1a. The cDirA 112 may only implement the request type sensitive cache coherence protocol described herein for embodiments of the invention or may be configured to currently operate in a mode supporting said request type sensitive cache coherence protocol (for example, the cDir may currently operate in hardwareWrite-softwareRead-cc-mode described already for embodiments of the invention).

In step 702, thread A1 issues a read command for a software object O1 that is completely or partially contained in a memory line M whose copy C1 is cached in the first local cache CA1. After the read command has been performed by the first processor core, the first thread sends a notification to the second thread A2. The notification indicates that the first processor core has finished a read operation of said copy C1. At a later moment in time, another software thread executed on the second processor core may write another object O2 to another copy C2 of the memory line M, the other copy C2 being stored in the second local cache. The cDir ensures that upon having finished the write operation in step 704, the coherence table is updated to indicate that the second local caches the new owning cache and that the second processor core has exclusive write permissions in respect to the memory line M. After having updated the coherence table, the second thread A2 sends in step 706 a second notification to the first software thread A1. The second notification indicates that the second thread A1 has finished writing object O2 to the memory line copy C2. Thus, the reading thread A1 is informed that the writing thread A2 is done writing the data object whose cache coherence is to be insured according to the new request type sensitive cc-protocol. This information provided in the second notification enables the software application program 402 to determine that the copy C1 in the first local cache has become stale ("outdated"), because there exists a more up-to-date copy C2 of the memory line M in the second local cache. The notification may be provided for example by an application programming interface (API) that supports shared memory multiprocessing programs and the exchange of information between concurrently executed software threads. An example for such a programming interface is the OpenMP (Open Multi-Processing) API that supports multi-platform shared memory multiprocessing programming in C, C++, and Fortran on most platforms, processor architectures and operating systems, including Solaris, AIX, HP-UX, Linux, OS X, and Windows. It consists of a set of compiler directives, library routines, and environment variables that influence run-time behavior. OpenMP uses a portable, scalable model that gives programmers a simple and flexible interface for developing parallel applications for platforms ranging from the standard desktop computer to the supercomputer. A further example for an API that supports multi-platform shared memory multiprocessing programming is the POSIX Pthreads API.

In response to receiving the invalidation notification, the first local cache in step 708 performs an invalidation command. Step 708 corresponds to step 414 of FIG. 2. The invalidation command is an instruction that may be included in a piece of software by a programmer manually or by a compiler automatically or semi-automatically (e.g. by processing annotations contained in the software's source code). The invalidation command invalidates the unmodified read copy of the ML.

For example, the invalidation command can be a dcbf (Data Cache Block Flush) command that invalidates an unmodified cache block or line in said local cache and that copies a modified cache block or line from a local cache to main memory and invalidates the line in said local cache. The dcbf command (or "dcbf instruction") is supported in the PowerPC® architecture. In other system architectures, other commands may be used, for example DCCMVAC in the ARM architecture.

In step 710, the first thread A1 may issue a second read command for object O1 of the memory line M. As the copy C1 has meanwhile been invalidated in step 708 and the first local cache, and up-to-date copy of the memory line M is requested by the first local cache from the cDirA 112. The cDirA 112 provides in step 712 the up-to-date copy C2 of the memory line M cached in the second local cache via the main memory to the first local cache, thereby storing the up-to-date copy C3 of the memory line M in the first local cache. As a consequence, the first thread A1 can read in step 714 the object O2 from the up-to-date copy C3 cached in the first local cache CAL Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by hardware-software or firmware-implemented program instructions as respectively indicated in the description.

Embodiments of the present invention may be implemented as a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The instructions may be configured for carrying out operations of the present invention, e.g. for providing a software capable of using the new request type sensitive cDir operation mode. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The computer-readable instructions may be assembler instructions, or source code or object code written in any combination of one or more programming languages, including an object oriented programming language such as Smalltalk, C++ or the like, and conventional procedural programming languages, such as the "C" programming language or similar programming languages.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

According to embodiments of the invention, the computer system is, for example, a general purpose computer, a special purpose computer, or other programmable data processing apparatus implementing the hardware- and/or firmware implemented functions/acts specified in the flowchart and/or block diagram block or blocks. In particular, the computer system may include a cDir as described for embodiments of the invention. In addition, the computer system may include a storage medium including the computer readable program instructions mentioned above.

The invention claimed is:

1. A computer system comprising:
a first processor core and a first local cache, the first local cache being operatively coupled to the first processor core for caching memory lines to be accessed by the first processor core, the first local cache comprising first permission information indicating to which ones of the memory lines cached in the first local cache the first processor core has exclusive write permission;
a second processor core and a second local cache, the second local cache being operatively coupled to the second processor core for caching memory lines to be accessed by the second processor core, the second local cache comprising second permission information indicating to which ones of the memory lines cached in the second local cache the second processor core has exclusive write permission;
a main memory operatively coupled to the first and the second local cache to provide memory lines to the first and the second local caches;
a coherence table of a coherence directory and the first permission information comprising entries for addresses of memory lines cached in the first local cache for which the first processor core has exclusive write permissions, and wherein the coherence table lacks entries for addresses of memory lines cached in the first local cache for which the first processor core lacks exclusive write permissions; and
the coherence directory being a firmware and/or hardware unit configured for ensuring that the first and second processor cores, each via its respective local cache, access the same sequence of data values written by the first or second processor core to a particular memory line of main memory, wherein the coherence directory, in response to receiving a request from the first processor core to perform a read or write operation on a particular memory line missed in the first local cache, determines if the second local cache comprises a copy of the particular memory line of main memory and has exclusive permission to write to said copy contained in said second local cache, and wherein based on the coherence directory returning TRUE the coherence directory:
requests the second local cache to remove the exclusive write permission of the second processor core for the copy of the particular memory line from the second permission information;
requests the second local cache to write the up-to-date data contained in said copy to the main memory; and
retrieves the up-to-date data from the main memory and stores the retrieved up-to-date data to the first local cache.

2. The computer system of claim 1 wherein the coherence directory:
based on the requested operation being a write operation, updates the coherence table of the coherence directory and the first permission information to respectively indicate that the first processor core has exclusive write permission on the provided up-to-date data in the first local cache; and
based on the requested operation being a read operation, updates the coherence table to indicate that none of the processor cores of the computer system has exclusive write permission on the particular memory line of main memory.

3. The computer system of claim 1, further comprising an application program running on the first and second processor cores, wherein:
   in response to receiving a request from the first processor core to perform a read operation on a particular memory line that is cached in the first local cache, the coherence directory allows the first processor core to read a cached memory line from the first local cache irrespective of permission information in the coherence table, wherein the coherence directory relies on the application program to ensure that the particular memory line cached in the first local cache comprises up-to-date data when the first processor core performs the requested read operation; and
   prior to requesting the first processor core to perform the read operation on a particular memory line being cached in the first local cache, the application program invalidates a potentially outdated copy of the particular memory line being cached in the first local cache.

4. The computer system of claim 1, further comprising an application program running on the first and second processor cores, wherein:
   in response to receiving a request from the first processor core to perform a write operation on a particular memory line that is cached in the first local cache, the application program allows the first processor core to write to a cached memory line in the first local cache, thereby keeping the second permission information and the coherence table unmodified; and
   prior to requesting the second processor core to perform a read operation on a particular memory line being cached in the second local cache, the application program invalidates a potentially outdated copy of the particular memory line being cached in the second local cache.

5. The computer system of claim 1, wherein the coherence table lacks a column for storing the existence of a shared read copy of a memory line in any of the local caches and wherein the coherence table lacks a column for storing the identities of each local cache with a shared read copy of the cache line, the coherence table comprising:
   a first column comprising addresses of cached memory lines cached in the first, second or any other local cache of the computer system, and
   a second column comprising an identifier of the respective local cache comprising a cached memory line whose address is contained in the same row; and
   the assignment of a memory address and the identifier within a row indicating that the processor core operatively coupled to the identified local cache has exclusive write permission in respect to said cached memory line.

6. The computer system of claim 1, wherein the first processor core and the second processor core is of a processor core type selected from the group consisting of a CPU core, a GPU core or a FPGA core, and wherein the first processor core and the second processor core include either the same type or of different types.

7. The computer system of claim 1 further comprising:
   a first processor and a second processor being operatively coupled to each other via an inter-processor communication fabric and respectively being operatively coupled to the main memory;
   the coherence directory, the first and second processor cores, the first and second local caches being contained in the first processor;
   the second processor comprising a third local cache, a third processor core, a fourth local cache, a fourth processor core and a further coherence directory;
   the third local cache being operatively coupled to the third processor core for caching memory lines to be accessed by the third processor core, the third local cache comprising third permission information indicating to which ones of the memory lines cached in the third local cache the third processor core has exclusive write permission;
   the fourth local cache being operatively coupled to the fourth processor core for caching memory lines to be accessed by the fourth processor core, the fourth local cache comprising fourth permission information indicating to which ones of the memory lines cached in the fourth local cache the fourth processor core has exclusive write permission;
   the coherence directory being a firmware and/or hardware unit configured for ensuring that the first, second, third and fourth processor cores, each via its respective local cache, access the same sequence of data values written by the first, second, third or fourth processor core to a particular memory line of a first part of the main memory; and
   the further coherence directory being a firmware and/or hardware unit configured for ensuring that the first, second, third and fourth processor cores, each via its respective local cache, access the same sequence of data values written by the first, second, third or fourth processor core to a particular memory line of a second part of the main memory.

8. The computer system of claim 7, wherein the further coherence directory, in response to receiving a request from the third processor core to perform a read or write operation on a particular memory line of the second part of the main memory, said particular memory line having been missed in the third local cache, the further coherence directory determining if the first, second or fourth local cache is an owning local cache, the owning local cache comprising a copy of said particular memory line and has exclusive permission to write to said copy contained in said owning local cache:
   in response to the further coherence directory determining TRUE, the further coherence directory:
   requests the owning local cache to remove the exclusive write permission of the respective processor core for the copy of the particular memory line from permission information associated with the owning local cache; and
   requests the owning local cache to write the up-to-date data contained in said copy to the main memory; retrieving the up-to-date data from the main memory and storing the retrieved up-to-date data to the third local cache.

9. The computer system of claim 8, wherein the further coherence directory:
   based on the requested operation being a write operation, updates a further coherence table of the further coherence directory and the third permission information to respectively indicate that the third processor core has exclusive write permission on the provided up-to-date data in the third local cache; and
   based on the requested operation being a read operation, updates the further coherence table to indicate that none of the processor cores of the computer system has exclusive write permission on the particular memory line.

10. The computer system of claim 7, wherein the further coherence directory checks permission information stored in the further coherence table, in response to receiving a request from the third processor core to perform a read or write operation on a memory line of the second part of the main memory, said memory line having been missed in the third local cache.

11. The computer system of claim 1, wherein the coherence directory updates a coherence table of the coherence directory to indicate that none of the processor cores of the computer system has exclusive write permission on the particular memory line, and wherein the coherence directory deletes a coherence table row comprising the address of a particular memory line for which the first processor core requested to perform a read operation and which was not cached in the first local cache.

12. The computer system of claim 1, further comprising:
a hardware-only-cc-mode wherein, in response to receiving a request of the first processor core to read or write data from or to a memory line missed in the first local cache, the coherence directory checks permission information in the coherence table for ensuring that the first and second processor cores, each via its respective local cache, access the same sequence of data values written by the first or second processor core to a particular memory line; and
a hardwareWrite-softwareRead-cc-mode wherein, in response to receiving a request of the first processor core to perform a write operation on a particular memory line, the coherence directory checks permission information in the coherence table for ensuring that the first and second processor cores access the same sequence of data values written by the first or second processor core to a particular memory line, the coherence directory relying on a software application executed on the first and second processor core to ensure that a read request reads an up-to-date copy of a particular memory line from the first local cache.

13. The computer system of claim 12, wherein based on the received request including a cc-mode bit value, the coherence directory:
upon receiving a request of the first processor core to perform a read or write operation on a memory line missed in the first local cache, identifies said memory line missed in the first local cache and evaluates the cc-mode bit value of said request; and
switches to hardware-only-cc-mode or hardwareWrite-softwareRead-cc-mode, based on the cc-mode bit value.

14. The computer system of claim 12, further comprising:
the coherence directory table in hardware-only-cc-mode comprising entries respectively identifying a memory line being cached in the first local cache and comprising meta-data indicating if the memory line cached in the first local cache was created in response to a read operation request or a write operation request; and
the coherence directory table in hardwareWrite-softwareRead-cc-mode each entry of the coherence table comprising entries respectively identifying a memory line being cached in the first local cache and lacking meta-data indicating if the memory line cached in the first local cache was created in response to a read operation request or a write operation request.

15. The computer system of claim 12, further comprising the first processor core being operatively coupled to a first memory management unit, and the second processor core being operatively coupled to a second memory management unit, wherein the first memory management unit:
receives cc-mode configuration data from a page table entry, wherein the first and second processor cores share the page table entry, the cc-mode configuration data indicating that an operating system or an application program currently executing on the first memory management unit to operate in hardwareWrite-softwareRead-cc-mode rather than in hardware-only-cc-mode when processing a memory page identified by the page table entry;
in response to receiving the cc-mode configuration data, assigns a first cc-mode bit value to each read request or write request directed at a memory line within said memory page, wherein the first memory management unit assigns the first cc-mode bit during a virtual-to-physical address resolution operation for said memory page; and
a first coherence directory switches to the hardwareWrite-softwareRead-cc-mode upon processing memory lines having assigned the first cc-mode bit value.

16. The computer system of claim 12, wherein the coherence directory:
identifies a threshold cache line number, the threshold cache line number being between 0 and a total number of memory lines whose coherence is controlled;
assigns a first cc-mode bit value to each memory line of the main memory whose sequence number is equal to or larger than the threshold cache line number;
assigns the first cc-mode bit value to each memory line of said total number of memory lines whose sequence number is equal to or larger than the threshold cache line number;
assigns a second cc-mode bit value to each memory line of said total memory lines whose sequence number is smaller than the threshold cache line number; and
switches to the hardwareWrite-softwareRead-cc-mode based on processing cache lines having assigned the first cc-mode bit value.

17. The computer system of claim 16, wherein the coherence directory:
receives cc-mode configuration data from an operating system or from an application program currently executed by the first processing core, the cc-mode configuration data indicating a preference for the coherence directory to operate in hardwareWrite-softwareRead-cc-mode rather than in hardware-only-cc-mode;
in response to receiving the cc-mode configuration data, identifies the threshold cache line number, wherein the magnitude of the threshold cache line number negatively correlates with a strength of preference for the hardwareWrite-softwareRead-cc-mode.

18. A computer-implemented method of ensuring cache consistency in a computer system, the method comprising:
in response to receiving a request from a first processor core to perform a read or write operation on a particular memory line missed in a first local cache, determining, by a coherence directory, if a second local cache comprises a copy of the particular memory line and has exclusive write permission to said copy contained in said second local cache, wherein a cache coherence protocol of the cache directory executes the received request in a hardware-only-cc-mode or a hardware- Write-softwareRead-cc-mode, based on an attribute setting included in the received request;

based on the determining returning TRUE:
- requesting, by the coherence directory, the second local cache to remove the exclusive write permission of the a processor core for the copy of the particular memory line from the second permission information;
- requesting, by the coherence directory, the second local cache to write up-to-date data contained in said copy to main memory, retrieving the up-to-date data from the main memory and storing the retrieved up-to-date data to the first local cache;

based on the requested operation being a write operation, updating a coherence table of the coherence directory and the first permission information to respectively indicate that the first processor core has exclusive write permission on the retrieved up-to-date data in the first local cache; and based on the requested operation being a read operation, updating the coherence table to indicate that none of the processor cores of the computer system has exclusive write permission on the particular memory line.

\* \* \* \* \*